July 25, 1950 L. HOCHGRAF 2,516,211
FILTER CONNECTING TELEPHONE TRANSMITTER TO POWER LINE DURING CALLS
Filed May 8, 1946
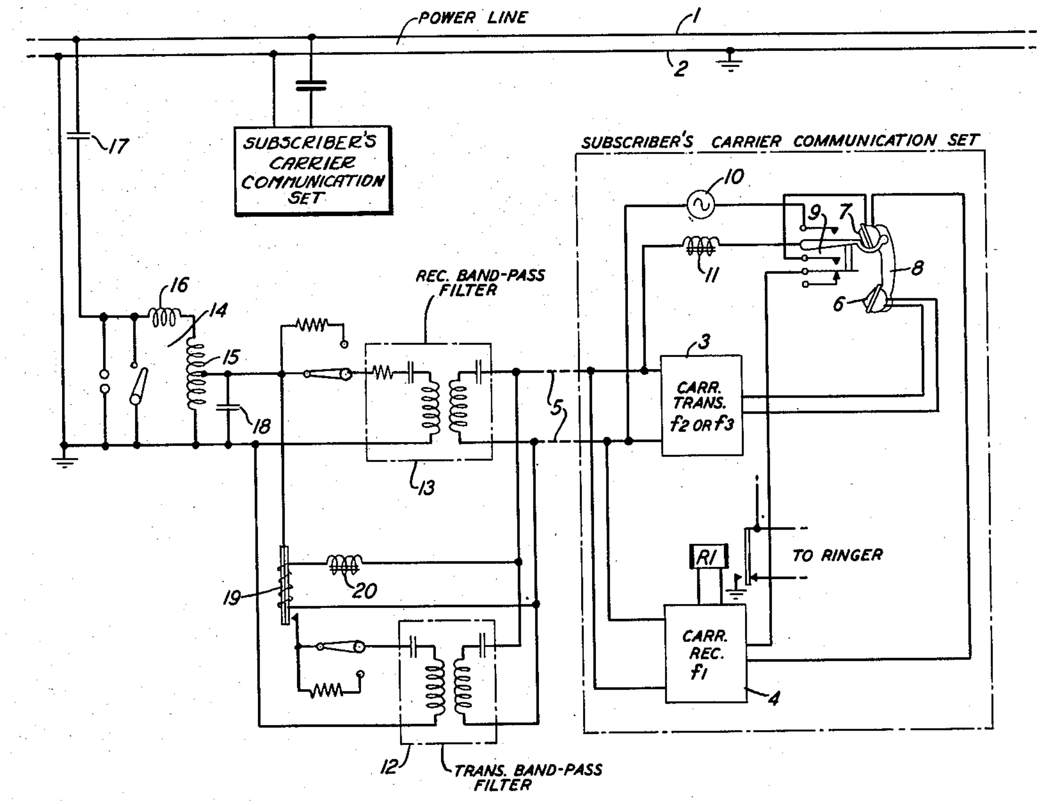
INVENTOR
L. HOCHGRAF
BY
Earl C. Laughlin
ATTORNEY Patented July 25, 1950 2,516,211

UNITED STATES PATENT OFFICE 2,516,211

FILTER CONNECTING TELEPHONE TRANSMITTER TO POWER LINE DURING CALLS

Lester Hochgraf, Maplewood, N. J., assignor to Bell Telephone Laboratories, Incorporated, New York, N. Y., a corporation of New York Application May 8, 1946, Serial No. 668,196

5 Claims. (Cl. 179—2.5)

The invention relates to electric wave communication systems and particularly to an arrangement for coupling signal communication equipment to a transmission line in such a system.

A general object of the invention is to reduce transmission losses in a signal communication system.

Another object is to reduce the loss to through transmission over a transmission line produced by signal communication equipment connected to the line, under certain conditions of operation of this equipment.

A related object is to couple a two-way signal communication set to a transmission line in a signal communication system in such manner as to reduce the bridging loss produced on the line by the communication set when the latter is not in use.

A more specific object is to reduce the loss to through transmission over a transmission line provided by a two-way carrier signal communication set bridged across the line, when the set is not being used for transmitting carrier signals to the line.

The above objects are attained in accordance with the invention in general by the provision of means associated with a coupling between a transmission line and a two-way signal communication station or set in a communication system, for causing a portion of the coupling which is required only for transmitting outgoing signals to the line, to be connected thereto only when the communication station or set is rendered operative to generate outgoing signals, thereby reducing the bridging loss on the line at all other times.

In one embodiment, the invention is applied to a carrier telephone system in which a number of subscriber two-way carrier telephone sets operating on the same or closely adjacent frequencies are bridged across a common transmission line, and in which, due to the relatively wide separation between the frequencies of the outgoing carrier signals generated by each set and the frequencies of the incoming carrier signals supplied thereto, separate parallel-connected band-pass filters are provided for selectively transmitting the outgoing carrier signals from each subscriber's set to the line and the incoming carrier signals from the line to the subscriber's set, respectively. In the coupling between each subscriber's set and the line, the connection of the transmitting band-pass filter to the line is normally broken so that only the receiving band-pass filter is connected in transmission relation between the subscriber's set and the line. When a subscriber removes his handset or receiver from the switchhook to place or answer a call, switching contacts are closed to connect energizing power to his carrier transmitter and also to an auxiliary relay means, the resultant operation of the latter completing the connection of the transmitting band filter between the carrier transmitter and the line so as to allow transmission of the generated outgoing carrier signals to the line. Thus, the carrier transmitter does not produce any loss in the through transmission, signal or power, on the line when the subscriber is not using his communication set.

The various features and objects of the invention will be better understood from the following detailed description when read in conjunction with the accompanying drawing, the single figure of which shows schematically a portion of a carrier telephone system embodying one modification of the invention.

The invention is particularly adapted for, although not limited to, use with a communication system employing one or more high frequency carrier channels to provide two-way telephone service on a party line or regular basis to a number of subscribers over a common line or other transmission medium through an individual carrier terminal for each channel. The common transmission medium may be, for example, a line used primarily for supplying low frequency, high voltage electric power to a number of consumers in a power distribution network. Such a system is disclosed, for example, in the copending United States patent application of R. C. Edson and J. W. Emling, Serial No. 653,254, filed March 9, 1946, now Patent No. 2,481,915, granted September 13, 1949. In the system disclosed in that patent, three different high frequency electrical waves per channel are employed as carriers for both signaling and speech transmission over the common line, transmission from the carrier terminal to a carrier telephone subscriber for one carrier channel on the line being always on one of these frequencies, say the frequency $f_1$, and transmission from each subscriber's station over the common line to the carrier terminal on that carrier channel being on either one of two other carrier frequencies, say frequency $f_2$ or $f_3$, depending on the type of call.

The drawing shows schematically a number of like carrier subscriber's stations of such a system connected to a common power line which, as illustrated, may be of the single phase type comprising a phase wire 1 and a parallel neutral wire 2, the latter being connected to ground at a number of spaced points.

As shown at one subscriber's station illustrated in detail in the drawing, the subscriber's carrier communication set at each station includes: a carrier transmitter 3 and a carrier receiver 4, the carrier frequency terminals of which are multipled and connected to the subscriber's carrier line drop 5; a telephone transmitter 6 and a telephone receiver 7, which, as illustrated, may be combined in a standard hand telephone set 8, respectively connected and adapted to be connected to the voice frequency terminals of the carrier transmitter 3 and the carrier receiver 4; the switching relay R1 under control of the carrier receiver 4 for performing ringing and switching functions in the manner described for the similar arrangement disclosed in the aforementioned patent application; a telephone hook switch 9; and a power source 10, which may be a source of direct current or an alternating or pulsating current of a frequency well removed from the frequencies of the transmitting and receiving carrier frequency band, for example, 60-cycle alternating current derived from the power line 1, 2 in any suitable manner, for energizing the subscriber's set through the radio frequency choke coil 11 under control of the hook switch 9.

The carrier transmitter 3 may include an amplifier, and an oscillator-modulator of any suitable type for producing a carrier of either one of two high frequencies, $f_2$ or $f_3$, and for modulating this carrier with audio frequency signals supplied from the associated telephone transmitter 6, or with dialing signals, for example, by interrupting the carrier source by means of a dial (not shown), so as to supply to the carrier line drop 5 signal sideband components as well as the unmodulated continuous or interrupted carrier components of these frequencies. The carrier receiver 4 may include an amplifier and a demodulator, which may be of any suitable varistor or vacuum tube type, adapted for detecting the speech or other signals received over the line 1 on the high frequency carrier $f_1$.

The subscriber's carrier line drop 5 connects in parallel to the transmitting band-pass filter 12 and the receiving band-pass filter 13, which may be of any suitable type and may include transformers, as indicated, for providing the required impedance matching between the connected circuits. The transmitting band filter 12 is designed for selectively transmitting one or both sideband components of the signal-modulated carrier wave of the frequencies $f_2$ and $f_3$, as well as the unmodulated carrier components of these frequencies, which may be applied to the filter from the drop circuit 5, and for suppressing harmonics and unwanted modulation products. The receiving band filter 13 is designed to selectively transmit one or both signal sideband component and the unmodulated carrier components of the carrier wave of the frequency $f_1$ incoming over the power line 1, 2 and for suppressing unwanted frequencies.

A common network 14 is used to couple the line sides of the transmitting band filter 12 and the receiving band-pass filter 13 to the power line 1, 2. The network 14, which includes the autotransformer 15 and the associated inductance coil 16 and condensers 17 and 18, is designed to match the impedance of the power line 1, 2 to the impedances of the band-pass filters; to selectively transmit a wide frequency band including the frequency ranges of both band-pass filters 12 and 13; to make the bridging loss on the line 1, 2 low outside that frequency band; and to prevent the low frequency power current transmitted over the power line 1, 2 from entering the carrier subscriber set.

The receiving band-pass filter 13 is connected through the network 14 in transmission relation with the line 1, 2 at all times, but the transmitting band-pass filter 12 is normally disconnected from the line 1,2 due to break in the connection to the network 14 provided by the normally open contacts of the normally deenergized relay 19, which may be of any suitable type, for example, a thermal relay as illustrated, to provide a required delay in operation, say of one or three seconds. The winding of the latter relay is connected through the series radio frequency choke coil 20 across the subscriber's carrier drop 5 and is normally deenergized due to the break in its energizing circuit from power supply source 10 provided by the normally open upper switch contacts of hook switch 9 while the subscriber's handset 8 remains on the switch-hook. For that condition of the circuit, that is, when the carrier subscriber is not using his set, because of the effective disconnection of transmitting band-pass filter 12 from the power line 1, 2, the carrier transmitter 3 produces no bridging loss at all on that line. Therefore, the subscriber's station will insert minimum loss to the through transmission over the power line.

When the subscriber at the station lifts his handset 8 off the hook switch 9 to initiate a call or to answer a call from another station, the resultant closing of the upper switching contacts of switch 9 will connect the power source 10 through the subscriber's carrier drop 5 and the series radio frequency choke coil 11, to the carrier transmitter 3 energizing the latter so that it sends out a carrier wave of the frequency $f_2$ or $f_3$.

The connection of the power source 10 across the carrier drop 5 in response to the lifting of the handset 8 from the switchhook, will also cause energizing current to be supplied from that source through the carrier drop 5 and the radio frequency choke coils 11 and 20 to the winding of the relay 19. This will cause operation of that relay in a short time to close its contacts thereby removing the normal break in the connection between the transmitting band-pass filter 12 and the filter network 14 so as to connect the transmitting band-pass filter 12 to the line 1, 2 through that network. The unmodulated carrier of the frequency $f_2$ or $f_3$ generated by the carrier transmitter 3, and/or one or both sidebands of the voice-modulated carrier of that frequency appearing in the output of the carrier transmitter 3 when the subscriber talks into his transmitter 7, will be transmitted through the transmitting band-pass filter 12 and the filter network 14 to the line 1, 2 and will be transmitted out over that line. The connection of the transmitting band-pass filter 12 to the line in the manner described will increase the bridging loss on that line, and this increased bridging loss will remain until the subscriber replaces his handset 8 on the switch-hook at the end of a call thus releasing the operated contacts of the hook switch 9. This will disconnect the power source 10 from the carrier transmitter 3 and the relay 19, deenerigizing both and returning the circuit to the normal condition indicated in the drawing in which the transmitting band filter 12 is effectively disconnected from the line 1, 2.

The function of the radio frequency choke coils 11 and 20 is to prevent loss or absorption of carrier frequencies. Suitable filters may be employed for this purpose in place of the choke coils. Also, separate wires (not shown) may be used for transmitting the energizing power to the relay 19 so as to make the use of such choke coils or filters unnecessary.

The use of the coupling arrangement in accordance with the invention described permits tighter couplings to the line to be used for the transmitter (or transmitters) in the subscriber carrier sets in use, and the unused transmitters associated with the other sets on the line will remain effectively disconnected from that line and, therefore, will produce no bridging loss on the through transmission over the line.

The term "bridging loss" is used in the specification and claims to describe the loss in transmission over the common transmission line produced in other communication carrier channels or systems on that line by a communication set connected to, or bridged across, that line.

Although the invention has been described as applied to a particular type of power line carrier telephone system it is applicable to any other type of telephone or other signaling system used for party line or regular service, and employing any other type of common transmission line for transmitting signals generated by each of the two-way signal communication sets connected to the line.

Various modifications of the circuits of the invention illustrated and described within the spirit and scope of the invention will be apparent to persons skilled in the art.

What is claimed is:

1. In combination, a transmission line, signal communication equipment, means for coupling said equipment to said line including filtering means comprising one portion for selectively transmitting outgoing signals from said communication equipment to said line and another portion for selectively transmitting incoming signals from said line to said communication equipment, said one portion of said filtering means being normally effectively disconnected from said line so as to reduce the bridging loss thereon when said equipment is not being used for outgoing signal transmission, said other portion of said filtering means being permanently connected in transmission relation between said equipment and said line, and means automatically operative when said equipment is conditioned for outgoing signal transmission to connect said one portion of said filtering means in transmission relation between said equipment and said line.

2. In combination, a transmission line, two-way signal communication equipment, means for coupling said equipment to said line including one filtering means conditioned at all times to selectively transmit incoming signals from said line to said equipment and another filtering means for selectively transmitting outgoing signals from said equipment to said line, said other filtering means only being normally effectively disconnected from said line so as to reduce the bridging loss thereon when said equipment is not being used for outgoing signal transmission, switching means for conditioning said equipment to transmit outgoing signals and means automatically operative when said equipment is conditioned for outgoing signal transmission, to connect said other filtering means in transmission relation between said equipment and said line.

3. In a carrier communication system, a transmission line, a subscriber's carrier communication set, a coupling circuit connected between said set and said line including one filtering means adapted to selectively transmit outgoing carrier signals of certain frequencies received from said set and another filtering means adapted to selectively transmit incoming carrier signals of other frequencies from said line to said set, the connection of said one filtering means only to said line being normally effectively broken so as to reduce the effective loss to through transmission over said line caused by said set during periods when the latter is not in use by the subscriber and switching means for completing the connection of said one filtering means to said line when said set is being used for outgoing signal transmission by the subscriber.

4. In a carrier communication system, a transmission line, one or more subscriber's carrier communication sets connected to said line for transmitting carrier signals of certain frequencies to and receiving carrier signals of other frequencies from said line, each set including a normally operative carrier signal receiver, a normally disabled carrier signal transmitter and switching means under control of the local subscriber for rendering said transmitter operative to generate the outgoing carrier signals, a circuit for coupling each subscriber's set to said line including one filter branch for selectively transmitting the carrier signals of said other frequencies incoming over the line to said carrier receiver thereof and a second filter branch for selectively transmitting the outgoing carrier signals of said certain frequencies generated by said transmitter, when it is operative, to said line, said second filter branch only being normally effectively disconnected from said line so as to reduce the bridging loss thereon during periods of non-use of said transmitter and control means for each of said subscriber's sets automatically operative when said switching means thereof is operated, to connect the second filter branch of the local coupling circuit to said line for selective transmission of the outgoing carrier signals generated by the transmitter of that set to said line.

5. In a carrier communication system, a transmission line and a plurality of subscriber communication stations bridged across said line, each of said stations including a source of power, a normally operative carrier receiver, a normally disabled carrier transmitter and switching means which, when operated under control of the local subscriber, causes energizing power to be supplied from said source to said carrier transmitter to render it operative to generate outgoing carrier signals, the coupling between each subscriber station and said line including one filtering branch for selectively transmitting incoming carrier signals from said line to the carrier receiver at the station, a second filtering branch for selectively transmitting outgoing carrier signals generated by the carrier transmitter at the station, when it is operative, to said line, the connection of said second filtering branch only to said line being normally effectively broken and thus reducing the bridging loss provided by the station during non-signal transmitting intervals on said line, and a relay also supplied with operating power from said source when said switching means is operated, and operating to complete in the connection of said second filtering branch to said line so as to allow the generated outgoing signals to be transmitted to said line.

LESTER HOCHGRAF.

REFERENCES CITED

The following references are of record in the file of this patent:

UNITED STATES PATENTS

| Number | Name | Date |
|---|---|---|
| 1,773,613 | Clark | Aug. 19, 1930 |
| 1,843,189 | Bailey | Feb. 2, 1932 |
| 1,843,227 | Herman | Feb. 2, 1932 |
| 2,212,389 | Chorpening | Aug. 20, 1940 |
| 2,218,087 | Goering | Oct. 15, 1940 |
| 2,264,397 | Moore | Dec. 2, 1941 |
| 2,294,905 | Honaman et al. | Sept. 8, 1942 |
| 2,332,782 | Crosby | Oct. 26, 1943 |
| 2,401,333 | Bumstead | June 4, 1946 |

OTHER REFERENCES

Army Training Manual 11-600, page 62, Mar. 25, 1943.